Jan. 30, 1945.   H. D. WARSHAW   2,368,278
REMOTE INDICATING SYSTEM
Filed July 12, 1943   2 Sheets-Sheet 1
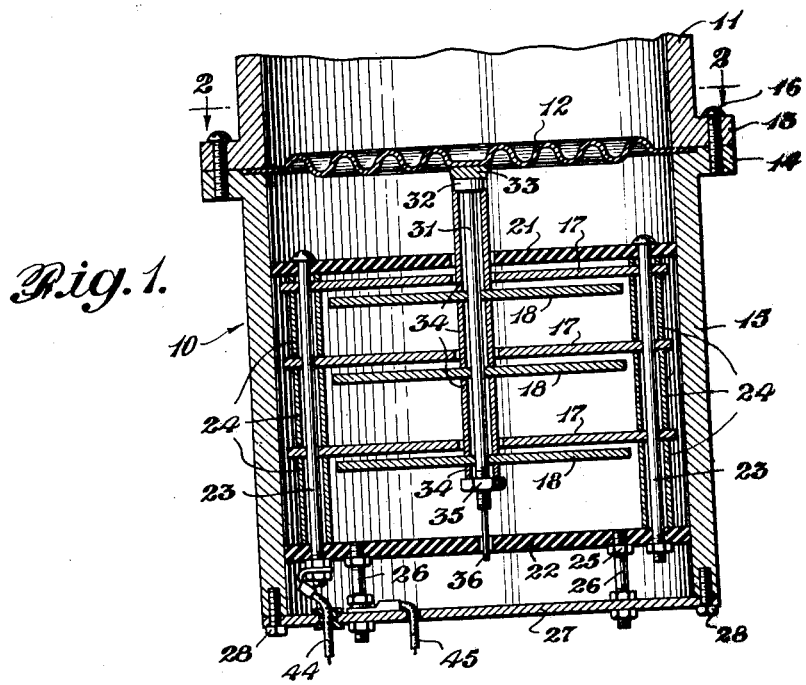
Fig. 1.
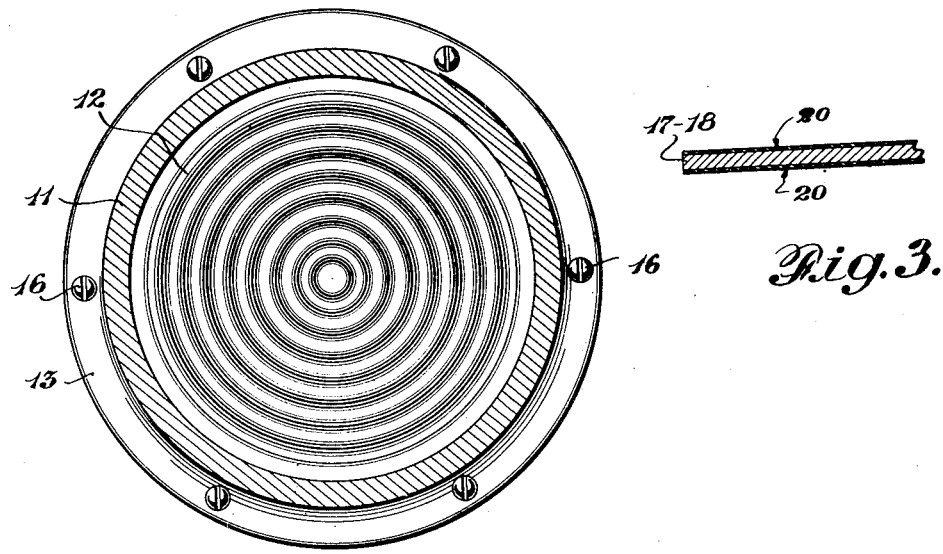
Fig. 2.
Fig. 3.
INVENTOR
HOWARD D. WARSHAW,
BY
ATTORNEY Jan. 30, 1945.  H. D. WARSHAW  2,368,278

REMOTE INDICATING SYSTEM

Filed July 12, 1943   2 Sheets-Sheet 2

INVENTOR
HOWARD D. WARSHAW,
BY
ATTORNEY

Patented Jan. 30, 1945

2,368,278

UNITED STATES PATENT OFFICE 2,368,278

REMOTE INDICATING SYSTEM

Howard D. Warshaw, Philadelphia, Pa.

Application July 12, 1943, Serial No. 494,336

6 Claims. (Cl. 177—351)

(Granted under the act of March 3, 1883, as amended April 30, 1928; 370 O. G. 757)

This invention relates to a pressure indicator and has for an object to provide a means of electrically obtaining a continuous remote indication of pressure, that is for providing a pressure indicator which may be placed at any desired location convenient for reading and which will respond to the movement of a diaphragm located at the source of the pressure.

A further object of this invention is to so construct a pressure indicator that the part subjected to the pressure may be located in any inaccessible location wherever the pressure may exist while the indicating means may be located at any desired location convenient for indicating and reading the same.

Still a further object of this invention is to provide a pressure indicator which includes a pressure sensitive diaphragm and a condenser whose electrostatic properties are varied in direct proportion to the pressure on the diaphragm together with a circuit connecting the condenser to an indicator which will continuously and instantaneously indicate the movement of the plates of the condenser and hence the movement of the diaphragm whereby the meter indication on the indicator will be a function of the pressure on the diaphragm, the calibration on the indicator, of course, being in any desired terms.

Still a further object of this invention is to provide a remote indicating pressure responsive device which may include a dampening diaphragm which also may be used to balance out undesired pressure acting on the pressure diaphragm.

Still a further object of this invention is to provide a pressure indicator which includes a pressure responsive diaphragm and a remotely situated indicator which is connected to the pressure diaphragm through an oscillator circuit wherein the tank circuit of the oscillator circuit includes a condenser whose plate distances are varied directly in proportion to the movement of the pressure diaphragm.

With the foregoing and other objects in view, the invention consists in the construction, combination and arrangement of parts hereinafter described and illustrated in the drawings in which:

Fig. 1 is a sectional view through the pressure sensitive device of this invention;

Fig. 2 is a sectional view on line 2—2 of Fig. 1;

Fig. 3 is an enlarged fragmentary sectional view of one of the condenser plates;

Figure 4:
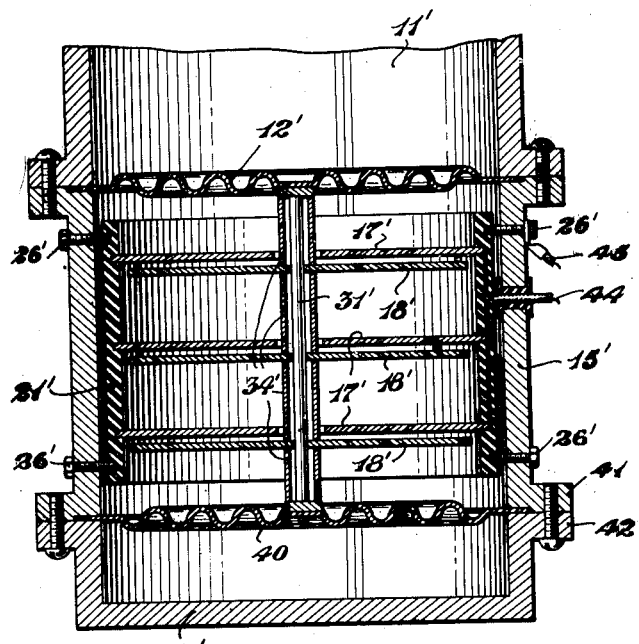
Fig. 4 is a section view similar to Fig. 1 of a slightly modified form of this invention.

There is shown at 10 one form of the pressure responsive device of this invention. This pressure responsive device 10 includes a pressure cylinder 11 provided with a pressure responsive diaphragm 12 secured between the flanged end 13 of the cylinder 11 and a similar flanged end 14 of a housing 15, the flanged ends 13 and 14 being secured together by screws 16.

Mounted within the housing 15 is a condenser assembly having one set of stationary plates 17 fixed to the housing 15 and the other set of plates 18 mounted for movement with the diaphragm 12 so that the distance between the set of plates 17 and the set of plates 18 will vary directly in proportion to the movement of the diaphragm 12 whereby the capacity of the condenser formed by plate 17 and 18 will be in direct proportion to the pressure in cylinder 11 acting against the diaphragm 12.

Inasmuch as the plates 17 may move sufficiently to bring them in physical contact with the plates 18, either the plates 17 or 18 or both may be covered with thin films 20 of insulating material on one or both sides thereof as shown in Fig. 3 so as to prevent electrical contact therebetween.

The means for mounting the plates 17 in the housing 15 includes a pair of annular insulating discs 21 and 22 mounted at opposite ends of the metal bolts 23 each of which are provided with a plurality of spacer sleeves 24 between which sleeves are located the fixed condenser plates 17. The entire assembly formed by the plates 17, bolts 23 and insulating discs 21 and 22 are held rigid with respect to housing 15 by means of the nuts 25 and bolts 26 secured to a housing cap 27 held on the end of housing 15 by means of screws 28.

The movable plates 18 are secured in a movable assembly to the diaphragm 12 by means of a bolt 31 whose head 32 is soldered or welded or otherwise secured as at 33 to the diaphragm 12. A plurality of spacer sleeves 34 similar to sleeves 24 serve to hold the plates 17 mounted on bolt 31 as a result of the nut 35 threaded on the end of bolt 31. Of course, each of the stationary plates 17 and the annular insulating disc 21 is provided with a suitable central aperture permitting movement of the sleeve 34 therethrough without physical contact. The insulating disc 22 is also centrally apertured to receive a guide pin 36 projecting from the end of bolt 31.

In the form of a pressure responsive device shown in Fig. 4, the diaphragm 12' at the end of the pressure cylinder 11' has secured thereon a central stud 31' which in turn is secured to the center of a second diaphragm 40 mounted between the flanged end 41 of the housing 15' and a flanged lip 42 of a housing cap 27'. The movable plates 18' are secured on the stud 31' in proper relation to each other by means of sleeves 34'. The stationary plates 17' are each mounted in proper relation to each other in an insulating cylinder 21' which in turn is secured to the housing 15' by screws 26'. In this form of the invention, primed reference numerals have been used and applied wherever there is a similar or identical element corresponding in function to the elements shown in Figs. 1, 2 and 3.

In both forms of the invention for maximum sensitivity, the plates are so adjusted relative to each other that the movable plates are in physical contact with the stationary plates while the pressure diaphragm 12 or 12' is relaxed or under no pressure. The devices shown in each form are essentially electrical condensers, the capacity of which varies as the distances between the stationary and the movable plates. Since the movable plates are carried by the diaphragm, the capacity of the condenser varies with the pressure on the diaphragm. In the form shown in Fig. 4, the diaphragm 40 may be used for air-damping of the movable assembly or it may be used to balance out undesired pressures acting on diaphragm 12'. In either form of the invention a lead 44 is electrically connected to the stationary plates 17 or 17', while a second lead 45 is electrically connected to the movable plates 18 or 18' through the housing and the diaphragm.

Figure 5:
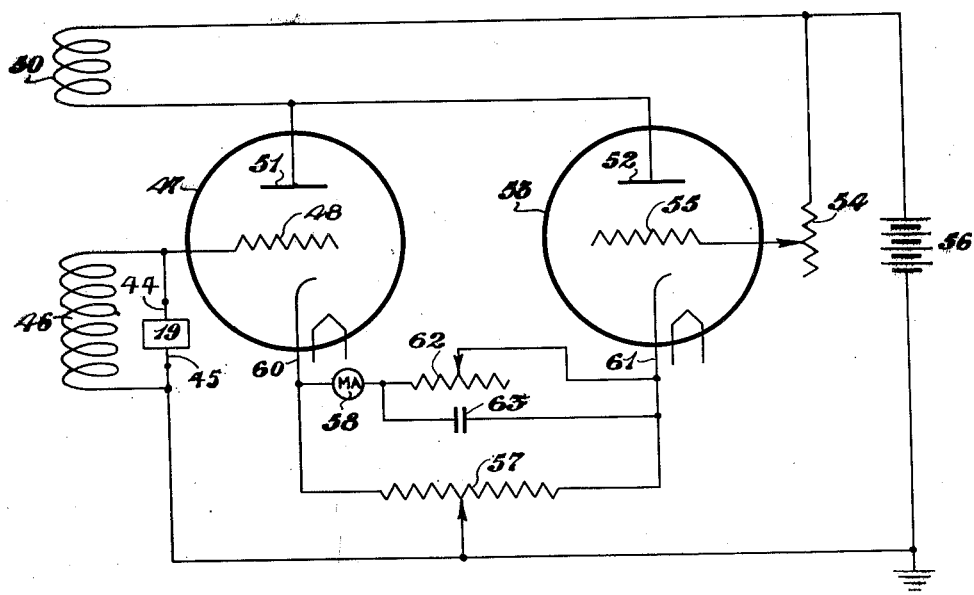
Fig. 5 is a schematic diagram of the circuit of of this invention.

The condenser 19 formed by the plates 17 and 18 or plates 17' and 18' as shown in Fig. 5 together with the coil 46 form the grid tank circuit of the oscillator tube 47, being connected at one side to the grid 48 of the tube 47. The coil 50 is the feed back coil of the oscillator circuit, being connected at one side to the plate 51 of the tube 47 and the plate 52 of another tube 53, while on its other side it is connected through a variable resistor 54 through the grid 55 of tube 53, the tube 53 acting as a direct current valve.

A battery 56 supplies the electrical energy for the entire circuit being connected as shown. The other side of the tank circuit is connected through the potentiometer 57 so as to permit zero adjustment of a milliammeter 58 connected across the cathode leads 60 and 61. A variable resistor 62 controls the sensitivity of the milliammeter 58 while a condenser 63 serves to by-pass alternating current around the resistor 62.

In operation the oscillator frequency will vary as the capacity of the condenser 19 varies. The oscillator output will vary as the frequency varies. The oscillator is first adjusted for maximum sensitivity by varying the resistor 54 until the current valve 53 is operating most critically. The meter zero control 62 is then adjusted so that the milliammeter 58 will indicate zero. At this time any change in oscillator output will cause an immediate indication other than zero. Therefore, the relative position of the diaphragm 12 or 12' and thereby of the movable plates 18 or 18' will be indicated instantaneously and continuously by the milliammeter 58. Preferably, the meter 58 instead of being calibrated in milliammeter terms may instead or in addition thereto be also calibrated in terms of the pressure acting on the diaphragms 12 or 12' in the cylinders 11 or 11' so that the pressure may be read directly on this pressure calibration. Obviously the meter 58 may be located in any convenient locations as distant as necessary from the pressure cylinders 11 or 11'.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, and a suitably calibrated meter to measure the direct current from said oscillator tube to said valve tube whereby the readings on said meter will vary in direct proportion to the varying of said condenser of said tank circuit.

2. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, and a suitably calibrated meter to measure the direct current from said oscillator tube to said valve tube, means for causing said condenser to vary in accordance with a variable whose variations are to be measured whereby said meter will indicate the variations of said variable.

3. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, said control means including a control grid and a variable resistor to said control grid, and a suitably calibrated meter to measure the current between said oscillator tube and said valve tube whereby the readings on said meter will vary in direct proportion to the varying of said condenser of said tank circuit.

4. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, said control means including a control grid and a variable resistor to said control grid, a suitably calibrated meter to measure the current between said oscillator tube and said valve tube, and means for causing said condenser to vary in accordance with a variable whose variations are to be measured whereby said meter will indicate the variations of said variable.

5. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, said control means including a control grid and a variable resistor to said control grid, a suitably calibrated meter to measure the current between said oscillator tube and said valve tube, means for eliminating current flow through the meter for any particular value of condenser capacity within the operating range of the circuit, and means for causing said condenser to vary in accordance with a variable whose variations are to be measured whereby said meter will indicate the variations of said variable.

6. An oscillator frequency circuit including an oscillator tube, said tube having a grid, a tank circuit controlling said grid, a direct current valve tube, a feed back coil to the tank circuit connected to the plates of both said tubes, the condenser of said tank circuit being variable, means for controlling the operation of said direct current valve tube to operate most critically, said control means including a control grid and a variable resistor to said control grid, a suitably calibrated meter to measure the current between said oscillator tube and said valve tube, means for eliminating current flow through the meter for any particular value of condenser capacity within the operating range of the circuit, said current flow eliminating means consisting of a potentiometer common to the tube tubes, and means for causing said condenser to vary in accordance with a variable whose variations are to be measured whereby said meter will indicate the variations of said variable.

HOWARD D. WARSHAW.